March 8, 1966  F. J. HARRIS ET AL  3,239,313
GRANULATOR
Filed April 19, 1962
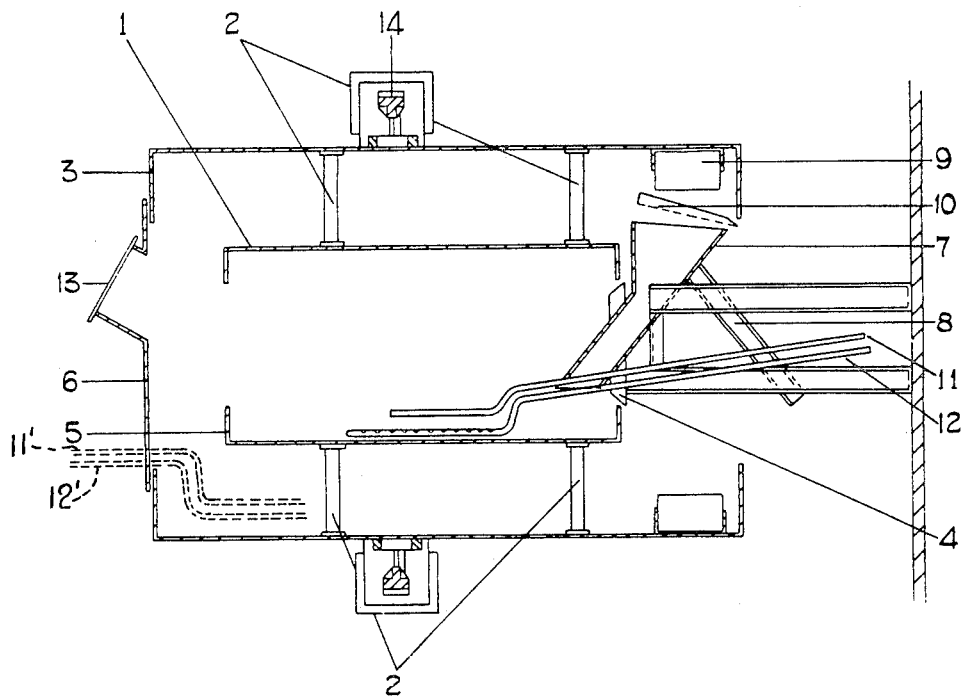
INVENTORS
FREDERICK JOHN HARRIS
JOHN MAIN McGOWAN
GEORGE ELLIS BOUGHEY
BY Cushman, Darby & Cushman
ATTORNEYS United States Patent Office 3,239,313
Patented Mar. 8, 1966

3,239,313
GRANULATOR
Frederick John Harris and John Main McGowan, Leith, Scotland, and George Ellis Boughey, Saughall, England, assignors to Scottish Agricultural Industries Limited, Edinburgh, Scotland, a corporation of Great Britain
Filed Apr. 19, 1962, Ser. No. 188,766
Claims priority, application Great Britain, Oct. 26, 1961, 38,378/61
15 Claims. (Cl. 23—259.1)

The present invention relates to granulators.

The object of the invention is to provide a granulator which permits granules to be produced substantially by a layering process in a more convenient and efficient manner than heretofore.

According to the present invention a granulator rotatable about a preferably substantially horizontal axis and comprising two drums concentrically mounted one within the other is one wherein both end portions of the inner drum have openings and at least one end of the outer drum has an opening, wherein the outer drum has lifting means for lifting thereinto and delivering therefrom solid material into receiving and transferring means adapted to receive and transfer said solid material to one end portion of the inner drum and wherein the other end portion of the inner drum allows solid material to be transferred from the inner drum to the outer drum, and is one which has stationary means for introducing material to be granulated, means for removing a portion of the granulated material and preferably stationary means to permit the removal of gases and vapours.

Preferably said lifting means comprises buckets or scoops fitted into the outer drum so that on rotation of the granulator they lift the material up and discharge it into said receiving and transferring means. The means adapted to transfer solid material delivered thereinto from the outer drum into the inner drum is preferably a stationary inclined chute.

Preferably the opening at said other end portion of the inner drum serves to transfer solid material from the inner drum to the outer drum. Preferably this opening is in a concentric position at said end of the inner drum. The diameter of this opening or hole controls the bed depth in the inner drum.

The stationary means for introducing material to be granulated may be stationary ducts through fixed end plates at any end of the granulator where the drums have open ends. It is preferable that these inlet ducts are located as close to and immediately after (when considering the circulation path) the point of transfer of solid material to the drum in question.

Should any heat or additional heat be required, it may be provided by a source of heat, for example by a gas flame from a burner through one of the aforementioned fixed end plates.

The granulator of the invention facilitates the formation of granules built up of a multiplicity of layers. Layered, or "onion skin" type granules are characteristic of a high "recycle ratio" process. By the term "recycle ratio" is meant the ratio of the rate of recirculation of solid material through the granulating system to the rate of withdrawal of product from the system, the latter rate under stable operating conditions being directly related to the rate of addition of material to be granulated. Hence the higher the recycle ratio the thinner the layers will be in the resulting granules. Moreover, the granulator of the invention, by permitting the achieving with ease of extremely high recirculation rates, allows the use of processes of higher recycle ratios than have heretofore been economically feasible, and hence can give rise to granules built up of unusually thin layers. The formation of very thin layers during each cycle enhances the removal of water which is normally present during granulation operations, improves the control of granulation and the product granule structure, and is very desirable, especially in processes of the kind claimed, for instance, in co-pending U.S. application Serial No. 152,265, filed November 14, 1961 and now abandoned, in which a granular product is made by the reaction of two or more reactants.

One reason why such high recycle ratio processes have not been economically feasible heretofore is that to achieve these ratios would mean imposing a large burden upon ancillary equipment, such as screens, driers, conveyors, elevators etc., normally associated with a granulator. However, the granulator of the invention provides means of internal recirculation within itself, thus reducing to a minimum the load on ancillary equipment. Furthermore, because of the compactness of the apparatus and the internal nature of the recirculation, heat losses are minimised.

A granulator in accordance with one preferred embodiment of the invention is one wherein each end of the inner and outer drum has a centrally placed opening, wherein the drums are rotatable on a substantially horizontal axis, and with respect to a stationary solid-transferring means which permits transfer of granules from the outer drum to the inner drum to stationary reactant-introducing means to permit introduction of reactants into the inner drum during rotation of the drums, and to stationary granule-discharging means to permit discharge of granules from the outer drum during rotation of the drums, wherein one of said openings of the inner drum has a stationary disc bearing against it with each of said stationary means passing through this disc and the other opening is of a diameter to control the bed depth of the granules in the inner drum, and preferably wherein that opening of the outer drum which is nearer to said other opening of the inner drum has a stationary disc bearing against it, this second stationary disc having a gas take-off for the granulator.

A granulator in accordance with another preferred embodiment of the invention is one wherein each end of the inner and outer drum has a centrally placed opening, wherein the drums are rotatable on a substantially horizontal axis and with respect to a stationary solid-transferring means which permits transfer of granules from the outer drum to the inner drum, to stationary reactant-introducing means leading into each drum to permit introduction of at least one reactant into each drum during rotation of the drums and to stationary granule-discharging means to permit discharge of granules from the outer drum during rotation of the drums, wherein one of said openings of the inner drum has a stationary disc bearing against it with said solid-transferring means and the stationary reactant-introducing means for the inner drum passing through the disc and the other opening is of a diameter to control the bed depth of the granules in the inner drum, and preferably wherein that opening of the outer drum which is nearer to said other opening of the inner drum has a stationary disc bearing against it, this second stationary disc having a gas take-off for the granulator.

Preferably in both said embodiments said stationary solid-transferring means which permits transfer of granules from the outer drum to the inner drum and the stationary discharging means to permit discharge of granules from the outer drum during rotation of the drums are combined and form a bifurcated chute.

An embodiment of a granulator according to the invention will now be described by way of example with reference to the accompanying diagrammatic drawing, which is a diametrically sectional elevation through the granulator. In the drawing an inner drum 1, is mounted concentrically on supports 2, attached to an outer drum 3. The unit is mounted horizontally. A fixed plate 4, is located at one end of the inner drum 1, and the other end of the inner drum 1, is fitted with a lip 5, defining an unobstructed opening from the inner drum to the outer drum as shown in the drawing, to transfer the granular material from the inner drum to the outer drum and to retain the desired depth of circulating solid material. A fixed plate 6, is located at one end of the outer drum 3.

The end plate 4, is fitted with a bifurcated chute 7, through which material is transferred from the outer drum 3, to the inner drum 1, or to a product offtake chute 8. On rotation of the granulator lifting cups 9, fitted in the outer drum 3, carry the solid material up until it drops through a scalping screen 10 into the chute 7.

The fixed plate 4, is also fitted with two pipes 11 and 12, shown in solid lines, which are the stationary reactant introducing means according to one embodiment of this invention for the addition of liquids or gases into the inner drum for use in the granulation. The elements 11' and 12' shown in dotted lines illustrate another embodiment of the invention wherein there are stationary reactant introducing means leading into each drum to permit introduction of at least one reactant into each drum.

The fixed plate 6, is fitted with a gas offtake 13.

In operation, rotation of the granulator, for example by a spur ring 14, and pinions, not shown, causes the circulation of the solid material through each drum in turn and past the two inlet pipes 11 and 12.

The granulator, as described, is mounted horizontally. However, this is not essential to the invention and the granulator may be mounted at any angle so long as the bed of solid particles can be caused to circulate in the manner hereinbefore described, if necessary with the aid of suitably placed lifting flights.

If desired, the two drums may be slightly conical in shape tapering outwards towards the output ends, thereby aiding the flow of non-gaseous material through the drums.

By way of example, granular fertiliser-grade monoammonium phosphate can be made as follows, in a granulator similar to that described with reference to the accompanying diagrammatic drawing. The drums 1 and 3, are 4 ft. long x 1¾ ft. diameter, and 5 ft. long x 3½ ft. diameter. They are rotated at 32 r.p.m. Wet-process phosphoric acid (48.4% $P_2O_5$) is added at a rate of 176 lb./hr. through pipe 11, on to a circulating bed of granules. The thus formed acid-coated granules are reacted with gaseous ammonia fed through pipe 12. The product is extracted through the bifurcation 8 in the chute 7. When the rate of recirculation of the granular bed is 12,000 lb./hr. the production rate is 160 lb./hr. (Recycle ratio=75:1). The product is in the form of hard, dry (0.1% $H_2O$), onion skin type granules of size 5–12 B.S. mesh.

From the foregoing it will be recognized that the recycle ratio and rate of circulation are subject to variation. Accordingly, it will be appreciated by those skilled in the art that the present invention is subject to obvious modifications and should only be limited to the extent shown by the following claims.

What we claim is:

1. A granulator rotatable an axis and comprising two drums concentrically mounted one within the other, wherein both end portions of the inner drum have openings and at least one end of the outer drum has an opening, said outer drum having lifting means for lifting thereinto and delivering therefrom all solid material into receiving and transferring means adapted to receive and transfer all said solid material to one open end portion of the inner drum whereby solid material of substantially the same particle size range continuously undergoes internal recirculation in said granulator, said other end portion of the inner drum defining an unobstructed opening for controlling the bed depth in the inner drum and for transferring all solid material from the inner drum to the outer drum, and means for continuously introducing material to be granulated into at least one of said durms and means for continuously removing a portion of the granulated material from the outer drum, the particle size range of the solid material being discharged from the means for removing a portion of the granulated material being substantially the same as the particle size range of the solid material undergoing internal recirculation in said granulator.

2. A granulator as claimed in claim 1 having stationary means to permit the removal of gases and vapors.

3. A granulator as claimed in claim 1 wherein the axis is substantially horizontal.

4. A granulator as claimed in claim 1 wherein said lifting means comprises scoop-shaped elements fitted into the outer drum so that on rotation of the granulator they lift the material up and discharge it into said receiving and transferring means.

5. A granulator as claimed in claim 1 wherein the means adapted to transfer solid material delivered thereinto from the outer drum into the inner drum is a stationary inclined chute.

6. A granulator as claimed in claim 1 wherein said opening in the other end portion of the inner drum for transferring solid material from the inner drum to the outer drum is in a concentric position at said end of the inner drum.

7. A granulator as claimed in claim 1 wherein the means for introducing material to be granulated are stationary ducts through a fixed end plate at the one open end portion of the inner drum.

8. A granulator as claimed in claim 7 wherein said inlet ducts for the inner drum are located close to and immediately after the point of transfer of solid material to the inner drum.

9. A granulator as claimed in claim 7 wherein the fixed end plate has a gas burner passing therethrough.

10. A granulator as claimed in claim 1 wherein each end of the inner and the outer drum has a centrally placed opening, wherein the drums are rotatable on a substantially horizontal axis and with respect to a stationary solid-transferring means which permits transfer of granules from the outer drum to the inner drum, to stationary reactant-introducing means to permit introduction of reactants into the inner drum during rotation of the drums, and to stationary granule-discharging means to permit discharge of granules from the outer drum during rotation of the drums, and wherein said one open end of the inner drum has a stationary disc bearing against it with said stationary means for transferring granules from the outer drum to the inner drum passing through this disc and said other open end of the inner drum is of a diameter to control the bed depth of the granules in the inner drum.

11. A granulator as claimed in claim 1 wherein each end of the inner and outer drum has a centrally placed opening, wherein the drums are rotatable about a substantially horizontal axis and with respect to a stationary solid-transferring means which permits transfer of granules from the outer drum to the inner drum, with respect to stationary reactant-introducing means leading into each drum to permit introduction of at least one reactant into each drum during rotation of the drums and with respect to stationary granule-discharging means to permit discharge of granules from the outer drum during rotation of the drums, and wherein said one open end of the inner drum has a stationary disc bearing against it with said solid material transferring means and the stationary reactant-introducing means for the inner drum passing through this disc and the other opening is of a diameter to control the bed depth of the granules in the inner drum.

12. A granulator as claimed in claim 10 wherein that opening of the outer drum which is nearer to said other opening of the inner drum has a stationary disc bearing against it, this second stationary disc having a gas-take-off for the granulator.

13. A granulator as claimed in claim 10 wherein said stationary solid-transferring means which permits transfer of granules from the outer drum to the inner drum and the stationary discharging means to permit discharge of granules during rotation of the drums are combined and form a bifurcated chute.

14. A granulator rotatable about an axis comprising two drums, one concentrically mounted within the other, wherein the outer drum has lifting means for lifting thereinto and delivering therefrom granular material into stationary receiving and transferring means adapted to receive and transfer said granular material to one end portion of the inner drum, wherein the other end portion of the inner drum is provided with an unobstructed opening leading from the inner drum to the outer drum for controlling the depth of granular material in the inner drum and for transferring granular material from the inner drum to the outer drum, said granulator having means for introducing reactants to the inner drum and means for removing a portion of the resulting material from the outer drum, the total discharge capacity of said lifting means being such that the relationship between this total discharge capacity, the speed of rotation of the drums, the dimensions of the drums and the rate of delivery of reactants permit a multilayer granular product to be produced from a bed of granules introduced into at least one of the two drums.

15. A reaction apparatus for producing a multilayered granular material having a plurality of successive thin onion skin type layers from a plurality of reactants comprising in combination two concentrically mounted drums, both said drums being rotatable about a common axis and both said drums having first and second end portions, the outer drum having lifting means for elevating granular material in said outer drum and for delivering therefrom the granular material into first stationary receiving and transferring means adapted to receive and transfer the elevated granular material to the first end portion of the inner drum, the second end portion of the inner drum being provided with an unobstructed opening leading from the inner drum to the outer drum for controlling the depth of granular material in the inner drum and for transferring granular material in the inner drum from the inner drum to the outer drum, said reaction apparatus having second stationary means for introducing a plurality of reactants into the inner drum to permit the reactants to react in said reaction apparatus and form reacted material in layers on the granular material, said reaction apparatus having third stationary means for removing a portion of multilayered granular material from the outer drum of the reaction apparatus, the speed of rotation of the drums and the rate of delivery of reactants being variable such that the relationship between the total discharge capacity of the lifting means, the total capacity of the drums, the speed of rotation of the drums and the rate of delivery of the reactants permits the granular material to recirculate through said inner drum and outer drum a plurality of times such that the granular material accumulates said reacted material in the form of a plurality of successive thin onion skin type layers thereon.

References Cited by the Examiner
UNITED STATES PATENTS

| | | |
|---|---|---|
| 1,980,130 | 11/1934 | Fasting. |
| 2,948,948 | 8/1960 | Duplin et al. |
| 3,097,833 | 7/1963 | Harris et al. _____ 23—259.1 |

MORRIS O. WOLK, *Primary Examiner.*

WILLIAM J. STEPHENSON, *Examiner.*